United States Patent [19]

Rich

[11] 4,147,690

[45] Apr. 3, 1979

[54] SMOKE AND FIRE RESISTANT COMPOSITIONS

[75] Inventor: Russell P. Rich, Baltimore, Md.

[73] Assignee: The Burns & Russell Company of Baltimore, Baltimore, Md.

[21] Appl. No.: 860,220

[22] Filed: Dec. 13, 1977

Related U.S. Application Data

[63] Continuation of Ser. No. 627,457, Oct. 30, 1975, abandoned.

[51] Int. Cl.² ............................................. C08K 3/22
[52] U.S. Cl. ............................................. 260/45.7 R
[58] Field of Search ................................. 260/45.7 R

[56] References Cited

U.S. PATENT DOCUMENTS 3,816,367  6/1974  Larkin et al. .................... 760/45.7 R

FOREIGN PATENT DOCUMENTS 1080468  8/1967  United Kingdom.

OTHER PUBLICATIONS

Flammability of Solid Plastics – vol. 7 of Fire and Flammability Series—1974, pp. 263 to 275; Sabolev et al.
Journal of Fire and Flammability – pp. 51 to 84, (1972), article by Pitts.

*Primary Examiner*—V. P. Hoke
*Attorney, Agent, or Firm*—Cushman, Darby & Cushman

[57] ABSTRACT

A combination of (1) magnesium hydroxide and (2) alumina trihydrate has been found to have synergestic properties in reducing smoke and/or flame spread in many polymer compositions when compared to the use of either alone. In some cases even better results are obtained by including antimony trioxide or antimony trioxide together with finely divided silica.

57 Claims, 5 Drawing Figures

Fig. 4.

SMOKE AND FIRE RESISTANT COMPOSITIONS

This is a continuation, of application Ser. No. 627,457 filed Oct. 30, 1975, now abandoned.

The present invention relates to novel compositions useful in reducing smoke and flame spread in polymer compositions.

It is known that alumina trihydrate ($Al_2O_3 14 .3H_2O$) with or without antimony oxide (plus or minus silica) is useful in flame retardant compositions. Thus attention is directed to Burton U.S. Pat. No. 3,741,929, Culderwood patent 3,189,513, Norman U.S. Pat. No. 3,810,851, Denk U.S. Pat. No. 3,677,999, Ashton U.S. Pat. No. 3,560,253 and Plastics World July 21, 1975 pages 39-44.

Likewise it has been known that magnesium hydroxide with or without antimony oxide ($Sb_2O_3$) also is useful in flame retardant compositions. Thus attention is directed to Bierly U.S. Pat. No. 2,667,425, Bierly U.S. Pat. No. 2,718,479, Hopkinson U.S. Pat. No. 2,610,920 (which incidentally mentions aluminum oxide but not aluminum oxide trihydrate), Larkin U.S. Pat. No. 3,816,317, and Sergovic Canadian Pat. No. 796,347.

Subsequent to the development of the present invention there has been reported the use of hydrated alumina and a magnesium-zinc combination as a smoke suppressant composition for polyvinyl chloride (PVC), see Plastics Engineering July 1975 pages 41-44 and a combination of magnesium hydroxide and alumina trihydrate has similarly been disclosed as a smoke reducant for SBR/natural rubber foam, see Modern Plastics Aug. 1975 page 120 reporting an article by Lawson et al in Rubber Chem. & Tech. Vol. 48 pages 124-131 (Mar.-Apr. 1975).

It has now been found that a combination of (1) aluminum trihydrate and (2) magnesium hydroxide acts synergistically in reducing smoke and/or flame spread in many polymer compositions compared to the use of either (1) or (2) alone. As polymer compositions there are employed polyesters, epoxy resins, vinyl halide polymers, e.g., polyvinylchloride, vinyl ester polymers, e.g., polyvinyl acetate, monoolefin polymers, e.g., polyethylene and polypropylene, or polyurethanes.

It has further been found that in many cases still further improved properties can be obtained by including in the composition in addition to the alumina trihydrate and magnesium hydroxide antimony oxide and still better results are sometimes obtained by additionally including silica. Examples of all these formulations will be set forth hereinafter. The additions of the present invention are normally employed in finely divided form.

Unless otherwise indicated all parts and percentages are by weight. The range in proportions of magnesium hydroxide to alumina trihydrate can vary from 1:99 to 99:1, more preferably from 3:97 to 97:3, still more preferably from 95:5 to 5:95 and usually from 2:1 to 1:2, more preferably 2:1 to 1:1.

The combination of (1) the mixture of magnesium hydroxide and alumina trihydrate to (2) antimony trioxide or antimony trioxide and silica can range, for example from 99:1 to 75:25 and most preferably is 90:10.

When a mixture of antimony trioxide and silica is employed, the ratio of $Sb_2O_3$ to $SiO_2$ is usually from 1:99 to 50:50, preferably 25:75.

The novel magnesium hydroxide and alumina trihydrate compositions of the invention (with or without antimony trioxide with or without silica) can be used to impart smoke reduction and flame spread resistant properties to:

(A) ethylenically unsaturated polyester resins, e.g., resins made from a dibasic acid or glycol either or both of which can contain a carbon to carbon double bond as well as an ethylenically unsaturated monomer. Polymerization is usually carried out by radical chain polymerization involving these double bond and employing free radical catalysts.

Examples of suitable polycarboxylic acids (including anyhydrides) are dibasic acids and anhydrides, such as maleic acids, fumaric acid, maleic anhydride, tetrabromopthalic anhydride, tetrahydrophthalic anhydride, phthalic anhydride, adipic acid, azelaic acid, isophthalic acid, terephthalic acid, 1, 4, 5, 6, 7 7-hexachlorbicyclo-(2, 2, 1)-5-heptene -2, 3- dicarboxylic anhydride (HET) anhydride) also called chlorendic anhydride and the corresponding dibasic acid (HET acid, also called chlorendic acid), malic acid, pimelic acid, suberic acid, sebacic acid, itaconic acid, citraconic acid and succinic acid.

As polyhydric alcohols there can be used for example ethylene glycol, propylene glycol, trimethylpentanediol, propylated bisphenol A, dibromoneopentyl glycol, dipropylene glycol, diethylene glycol, neopentyl glycol, 3-butylene glycol, 1, 2-butylene glycol, propylated retrabromo bisphenol A, 2, 3-butylene glycol, 1,5-pentanediol, triethylene glycol and higher polyhydric alcohols such as glycerine, pentaerythritol, etc.

The ethylenically unsaturated monomer can be for example styrene, vinyl toluene, e.g., o-vinyl toluene, p-vinyl toluene or m-vinyl toluene, methyl methacrylate (for improved weathering properties), dialkyl phthalate (especially for molding compounds), trialkyl cyanurate (for heat resistance), vinyl acetate, alpha-methyl styrene, cyclopentadiene, vinylidene chloride, alkyl acrylates e.g., ethyl acrylate, 2-ethylhexyl acrylates and methyl acrylate, 2, 4-dichlorostyrene, diallyl succinate, diallyl maleate, allyl alcohol, acrylonitrile, methyl vinyl ketone, diallyl ether, allyl acrylate, diethylene glycol (allyl carbonate) ethylene glycol dimethacrylate, divinyl benzene, allyl diglycolate, allyl maleate, ethyl methacrylate, allyl acetate, etc.

The polyesters usually contain upward of 15%, e.g., 30% and often 50 to 85% of the polyester resin and the balance the ethylenic monomer.

As catalysts thus can be used for example, benzoyl peroxide, methyl ethyl ketone peroxide, Percadox 16 (bis (4-t-butylcyclohexyl) peroxycarbonate), acetyl peroxide, lauroyl peroxide, USP-245 or Luperco 256 (2, 5-dimethyl -2, 5-bis (2-ethylhexanoylperoxy) hexane) and cumene hydroperoxide.

In the polyester systems there can be used conventional promoters. Thus DMA (dimethyl aniline) activates benzyl peroxide and Percadox 16 at room temperature. It also activates methyl ethyl ketone peroxide-cobalt systems.

Cobalt usually as a 6% solution of cobalt naphthenate or cobalt octoate in an inert solvent is also employed to activate methylethyl ketone peroxide catalyzed polyester resins at room temperature.

As is known in the art the ultimate properties of the cured polyester are a function of the polyester composition polyester molecular weight and monomer content. The following table gives a correlation of certain commercial polyesters and uses:

| Application | Polyester Type |
|---|---|
| General Purpose | phthalic-maleic-propylene glycol |
| Improved physical properties | isophthalic esters |
| Hydrolytic stability | Neopentyl glycol (NPG) esters |
| Chemical Resistance (CR) | Isophthalic 'NPG esters', propoxylated bisphenol A-fumaric esters |
| Flame Retardant (FR) | Halogenated acids and glycols |
| CR and FR | Chlorendic acid (HET acid) - NPG esters, propoxylated tetrabromo bisphenol A-fumaric ester; |
| brominated | NPG esters |
| Weatherability | Isophthalic-NPG ester in styrene and methyl methacrylate monomer with a U.V. light absorber |

The preparation of a general purpose polyester to which flame retardant and smoke reducing synergistic additives of the invention can be added is set forth in example A.

Example A

| Phthalic Anhydride | 1 mole |
|---|---|
| Maleic Anhydride | 1 mole |
| Propylene glycol | 2.1 mole |

The ingredients are processed in a closed reactor equipped with a stirrer, inert gas inlet, fractionating column and condenser. The batch is gradually heated to 400° C. while removing water of esterification. Heating was terminated at a 30-35 acid value. The ester is then cooled to 120-130° F., inhibited with 0.01-0.03% hydroquinone type inhibitor and thinned with styrene monomer. Depending on the desired viscosity the final solution can contain 20-35% styrene. The inhibitor prevents premature reaction with the monomer and provides adequate shelf-life.

Commercial polyester products include the following:

Marco GR 77006 — An unpromoted isophthalic maleic-neopentyl glycol polyester with good hydrolytic stability. Nominal styrene content 46%.

Marco GR 12227 — A promoted high reactivity general purpose polyester for sanitary ware. Phthalic anhydride-maleic-propylene glycol base. Nominal styrene content 45% MEK peroxide for room temperature cure.

Paraplex P43 — An unpromoted general purpose resin. Phthalic-maleic-propylene glycol polyester. Nominal styrene content 30%.

Vibrin F-95 — A promoted, thixotropic isophthalic polyester used for contact molding and filament winding. Nominal styrene content 47%.

Hetron 92 base — A solid chlorendic-maleic ester with high chlorine content (40%). Used as a styrenated solution at 40% styrene and 24% chlorine without additional inhibitor. This is a commercial flame retardant polyester at maximum chlorine level. Benzoyl peroxide or Percadox 16 plus DMA for R.T. cure.

Hetron 197A — A promoted flame retardant, chemical resistant resin based on chlorendic acid and neopentyl glycol. Nominal chlorine 18%, styrene 35%.

Vibrin V 534L S — (also identified as Vibrin V534FR) An unpromoted flame retardant light stable resin based on chlorendic ester and developed for corrugated sheeting. Nominal chlorine 20%, styrene 30% MEK peroxide for R.T. cure. (also catalyst + DMA promotion)

Dion 6693FR — A promoted flame retardant chemical resistant brominated resin. Nominal bromine 16%, styrene 37%. MEK peroxide for R.T. cure.

Atlac 711-05A — A promoted flame retardant, chemical resistant brominated product based on propoxylated tetrabromo bisphenol A. Nominal bromine 70%; styrene 50% MEK peroxide for R.T. cure.

GR - 77006 — Resilient resin with good hydrolytic stability. Isophthalic-maleic-neopentyl glycol base, 46% styrene, unpromoted. (Benzoyl peroxide or Percadox 16 plus DMA promotor for room temperature (R.T.) cure.

Thus the magnesium hydroxide and aluminum trihydrate smoke retardant compositions of the present invention can be employed with the polyesters resins disclosed in Sergovic U.S. Pat. No. 2,751,775, Sergovic U.S. Pat. No. 2,962,052, Russell U.S. Pat. No. 2,814,836, Calderwood U.S. Pat. No. 3,189,513, Robitschek U.S. Pat. No. 2,779,700, Robitschek U.S. Pat. No. 2,779,701, Ashton U.S. Pat. No. 3,560,253 and Sergovic Canadian Pat. No. 796,374. The entire disclosures of these United States and Canadian patents are hereby incorporated by reference and relied upon. Thus in place of the magnesium hydroxide in examples IA, 2A, 3A, 4A, 5A and 7 of the Sergovic patent there can be used the same weight of a 50:50 mixture of magnesium hydroxide and alumina trihydrate (Composition I). Similarly in Calderwood U.S. Pat. No. 3,189,513 examples VI, VII, VIII and IX there can be used in place of the alumina trihydrate and antimony oxide the same total weight of either (a) a mixture of 50% magnesium hydroxide, 50% alumina trihydrite (Composition I) or (b) a mixture of 60% magnesium hydroxide, 30% alumina trihydrate and 10% antimony trioxide (Composition II) or (c) a mixture as in (b) except employing 2.5% antimony trioxide and 7.5% silica in place of the antimony trioxide (Composition III).

(B) epoxy resin containing epoxide groups in the polymers prior to curing, e.g. having a 1.2-epoxy equivalency greater than one.

Thus there can be used epoxy ethers for use in the invention which are prepared by reacting a dihydric phenol with epichlorohydrin in alkaline solution. These products are of resinous character and frequently are solid materials at normal temperature (20°-30° C.). Any of the various dihydric phenols are used in preparing these glycidyl ethers, including mononuclear phenols like resorcinol, catechol, hydroquinone, etc., or polynuclear phenols like bis(4-hydroxyphenyl)-2, 2-propane (bis phenol-A), 4,4'-dihydroxy benzophenone, bis- (4-hydroxphenyl)-1, 1-ethane-bis-(4-hydroxyphenyl)-1, 1-isobutane, bis- (4-hydroxyphenyl)-2, 2-butane, bis- (4-hydroxy-2-methylphenyl) -2, 2-propane, bis-(hydroxy-2-methylphenyl) -2, 2-propane, bis-(hydroxy-2-tertiary butyl phenyl)2, 2-propane, bis- (2-dihydroxynaphthyl)-methane, 1,5-dihydroxynaphthalene, etc. The product may be represented by the formula:

wherein n is an integer, preferably from 1 to 7, and R represents the divalent hydrocarbon radical of the dihydric phenol.

The preferred epoxy ethers for use in the invention are those having epoxy values no less than 0.20 (pyridinium chloride method), and melting points no greater than 80° C. (Durran's mercury method). The pyridinium chloride and Durran's mercury method are disclosed in U.S. Pat. No. 2,500,499. The preferred phenol is bis phenol-A.

There also can be used 1, 2-epoxy-containing polyethers of polyhydric alcohols, such as poly glycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1, 2-epoxy equivalency greater than one, such as the polyglycidyl ethers of glycol, diglycerol, erythritol, pentaglycerol, mannitol, sorbitol, and the like.

In general, the glycidyl ether resin will have an epoxy equivalency greater than 1 and usually not more than about 2. The epoxy equivalency may be defined as the number of epoxy groups per molecule in contrast to the epoxy value which is the number of epoxy groups in 100 grams of the resin.

Typical epoxy resins which can be employed are the Epon resins which are made from bis-phenol-A and epichlorhydrin. The following table describes the properties of several such resins.

resins can be used alone or in admixture with each other or with other resins.

In using the epoxy resin compositions of the invention, a hardening agent is incorporated therewith. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic acid or phthalic anhydride; Friedel-Crafts metal halides like aluminum chloride; zinc chloride, ferric chloride or boron trifluoroide as well as complexes thereof with ethers, acid anhydrides, ketones, diazonium salts, etc.; phosphoric acid and partial esters thereof including n-butyl orthophosphate; diethyl orthophosphate and hexaethyl tetraphosphate; and amino compounds such as triethyl amine, ethylene diamine, diethyl amine, diethylene triamine, triethylene tetramine, m-phenylenediamine, 3-diethylaminopropylamine, pyridine, piperidine, dicyandiamide, melamine and the like. There can also be used other polyamines, polyamides, polypulfides, urea formaldehyde or phenol-formaldehyde. The hardening agent is added and mixed in with the composition in order to effect hardening. The amounts vary considerably depending upon the particular agent employed. For the alkalies or phenoxides, 2 to 4 percent is suitable. With phosphoric acid and esters thereof, good results are obtained with 1 to 10

Examples of Epoxy Resins

| Resin type* | Melting point, ° C. (Durans) | Color 25° C. (Gardner) | Eposide equivalent | Average molecular weight | Viscosity at 25° C., centipoises or Gardner-Holdt |
|---|---|---|---|---|---|
| Shell Chemical Co. (epon®): | | | | | |
| 562 | Liquid | 5 (max) | 140–165 | 300 | 150–210 |
| (glycerine based) | | | | | |
| 815 | Liquid | 8 (max) | 175–210 | 340–400 | 500–900 |
| (contains diluent) | | | | | |
| 820 | Liquid | 8 (max) | 175–210 | 350–400 | 4,000–10,000 |
| 828 | Liquid | 12 (max) | 175–210 | 350–400 | 5,000–15,000 |
| 834 | Liquid | 10 (max) | 225–290 | 450 | $A_2$–$A_1$ |
| 864 | 40–50 | 8 (max) | 300–375 | 700 | $A_1$–B |
| 1001 | 64–76 | 8 (max) | 450–625 | 900–1,000 | C–G |
| 1004 | 95–105 | 6 (max) | 870–1,025 | 1,400 | Q–U |
| 1007 | 125–132 | 8 (max) | 1,650–2,050 | 2,900 | Y–$Z_1$ |
| 1009 | 145–155 | 11 (max) | 2,400–4,000 | 3,800 | $Z_2$–$Z_5$ |
| 1310 | 77 | | 208 | 77 | |
| (tetraglycidyl ether) | | | | | |

*Based on bisphenol A unless otherwise noted. In 40 per cent butyl carbitol.
**At 60° C.
***At 130° C.

There can also be used epoxy resins such as Araldite 6010, viscosity 10,000–20,000 cps, at 22° C., and Araldite 6020, viscosity 20,000–40,000 cps. at 22° C. and Araldite 6071, softening point 70° C., epoxy value 2.05, Epoxide equivalent 485, these Araldite resins are made from bis phenol-A and epichlorhydrin.

These epoxy resins which are liquid at room temperature can be poured into the mold while those which are solids should be heated above their melting points. The mole is desirably also maintained above the melting point of the resin prior to the curing step. The epoxy percent added. The amino compounds are used in amounts of about 5 to 15 percent and the others involve addition of about 1 to 20 percent.

The amounts of catalysts are based on the epoxy resin by weight.

For example, the magnesium hydroxide and alumina trihydrate compositions for the present invention can be used in examples 1, 2, 3 and 4 of Denk U.S. Pat. No. 3,677,999 in place of the same weight of aluminum oxide trihydrate. Specifically there can be employed any one of Compositions I, II and III supra. The entire disclosure of Demk is hereby incorporated by reference and relied upon.

(C) polyurethanes either as solids of foams formed by reacting a polyisocyanate, e.g. a disocyanate with a polyol. The polyurethane can either be formed from a polyhydric alcohol such as a polyether having free alcohol groups or a polyester having terminal hydroxyl groups for example. The smoke reducant and flame retardant materials of the invention can be added to the monomers or if the polyurethane is formed from a prepolymer can be added to the prepolymer composition.

As polyols there can be used for example ethylene glycol, diethylene glycol, propylene glycol, dipropylene glycol, triethylene glycol, tetraethylene glycol, polyethylene glycol molecular weight 2000, polypropylene glycol molecular weight 4000, glycerine-propylene oxide adduct molecular weight 3000, sorbitol-propylene oxide adduct having 2 to 40 propylene oxide units, hexylene glycol, trimethylene glycol, 1, 2, 6-hexanetriol, 1, 2, 6-hexanetriol-propylene oxide adduct having 2 to 40 propylene oxide units glycerine, 1, 4-butanediol, isopropylidene bis (p-phenylene oxypropanol-2), trimethylol propane, trimethylol propane-propylene oxide adduct having 2 to 40 propylene oxide units, xylylene glycol, polytetramethylene glycol molecular weight 1000, oxyispropylated sucrose, polyepsilon caprolacton diol, castor oil, hydroxyethyl acrylate, polymer, hydroxypropyl methacrylate polymer, hydroxypropyl acrylate polymer, hydroxyethyl methacrylate polymer, polymeric esters having terminal hydroxyl groups such as esters of glycols such as ethylene glycol, propylene glycol, trimethylene glycol, tetramethylene glycol, 1, 4-butylene glycol, 1, 6-hexanediol, 1, 4-butenediol, diethylene glycol or thiodiglycol with succinic acid, adipic acid, maleic acid, dihydromuconic acid, thiodipropronic acid, phthalic acid, glutaric acid, methyl adipic acid, sebacic acid, dimerized linoleic acid, terephthalic acid, isophthalic acid, e.g. esters such as polyethylene adipate, polyethylene adipatephthalate, polyethylene-polypropylene adipate-maleate, propylene fumarate, ethylene tetrahydrophthalate.

As polyisocyanates there can be used for example toluene-2, 4-diisocyanate, toluene-2, 6-diisocyanate; 4-methoxy-1, 3-phenylene-diisocyanate; 4-chloro-1, 3-phenylene-diisocyanate; 4-isopropyl-1, 3-phenylene diisocyanate; 4-ethoxy-1, 3-phenylenediisocyanate; 2, 4-diisocyanatodiphenylether; 3, 3-dimethyl-4, 4-diisocyanatodiphenylmethane, mesitylene diisocyanate; durylene diisocyanate; 4, 4'-methylenebis (phenylisocyanate), benzidine diisocyanate, o-nitrobenzidine diisocyanate; 4-4'-diisocyanatodibenzyl; 1, 5-naphthalene diisocyanate; tetramethylene diisocyanate, 3, 3'-bitolylene-4, 4'-diisocyanate, hexamethylene diisocyanate, decamethylene diisocyanate, tritolylmethane triisocyanate, the reaction product of toluene diisocyanate with trimethylolpropane at an NCO/OH ratio of 2:1 (Modur CB), mixtures of 2, 4-2, 6-toluene diisocyanate (e.g. 80/20 and 65/35 mixtures), polymethylene polyphenyl isocyanate.

Of course conventional catalysts such as tertiary amines, e.g. triethylamine, N-methyl morphaline, N-ethyl morpholine, triethylenediamine, N, N, N', N'-tetramethylethylenediamine, dimethylaminoethyl piperazine and tin compounds can be employed such as dibutyltin dilaurate and tins soaps such as stannous octoate, stannous oleate and stannous stearate and other tin compounds such as those set forth in Hostettler French Pat. No. 1,212,252.

Thus in Kumasaka patent 3,737,400 examples 1, 2, 3, 4, 5 the ammonium sulfate or Al (OH)$_3$nH$_2$O can be replaced by the same amount of Compositions I, II and III above. Likewise Compositions I, II and III can be used to replace the alumina trihydrate or aluminum trihydrate and antimony trioxide in the same weight amounts in Normal U.S. Pat. No. 3,810,851 examples I, II, III, IV and V. The entire disclosures of Kumasaka and Norman are hereby incorporated by reference and relied upon.

(D) acrylate and methacrylate polymers, e.g. polymers of methyl methacrylate, butyl methacrylate, hydroxyethyl methacrylate, hydroxypropyl methacrylate, methyl acrylate, ethyl acrylate, butyl acrylate, 2-ethylhexyl acrylate. The preferred acrylate or methacrylate polymer is polymethyl methacrylate.

(E) vinyl ester polymers such as polymers of vinyl acetate, vinyl propionate and vinyl stearate. The preferred vinyl ester polymer is polyvinyl acetate.

(F) halogenated resins such as chlorinated polyethylene having 14 to 75°, e.g., 27 percent chlorine by weight, chlorinated natural and synthetic rubber, rubber hydrochloride, chlorinated polystyrene, chlorinated polyvinyl chloride, polyvinyl chloride, polyvinylidene chloride, polyvinyl bromide, polyvinylidene fluoride, polyvinyl fluoride, copolymers of vinyl chloride with 1 to 90 percent, preferably 1 to 30 percent of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate sold commercially as VYNW), vinyl chloridevinylacetate (87:13), vinyl chloride-vinyl acetate-maleic anhydride (86:13:1), vinyl chloride-fumarate (95:5), vinyl chloride-vinylidene chloride (95:5) vinyl chloride-trichloroethylene (95:5), vinyl chloride-2-ethylhexyl acrylate (80:20). The preferred halogenated resin is polyvinyl chloride.

(G) monoolefin polymers such as polyethylene, polypropylene, ethylene propylene copolymers, (e.g. 50:50, 80:20, 20:80, 95:5 and 5:90) and copolymers of ethylene with a minor amount of a monoolefin having 4 to 10 carbon atoms, e.g. ethylene-butene-1 copolymer (95:5) and ethylene-decene-1 copolymer (90:10). Thus the mixture of aluminum hydrate (alumina trihydrate) and antimony trioxide in Burton U.S. Pat. No. 3,741,979 examples 1, 2, 3 and 4 can be replaced by the same total amount of any one of Compositions I, II and III above. The entire disclosure of Burton is hereby incorporated by reference and relied upon. The smoke and flame reduction additives of the present invention can be added to the polymers (resins in an amount of from 4 (or 5) to 125 or even to 150 parts per hundred or resin (phr). The optimum performance frequently occurs at an additive rate of between 50 to 100 phr and sometimes between 70 to 100 phr. With polyvinyl chloride usually the amount of additive is not over 20% and is generally 5 to 10% of the polymer.

Naturally the most effective range will depend upon the polymer involved and may vary as the ingredients for processing and physical performance other than fire and smoke are adjusted to the particular needs of the use application. What is unexpected in the present formulations is the synergestic effect of the use of magnesium hydroxide and alumina trihydrate.

The flame and retardant additives of the invention are finely divided. In the working examples their particular sizes are such that over 95% have a particle size of not over 45 microns. Of course somewhat larger particle sizes can be employed, e.g. 250 microns. The exact particle size is not critical.

Flame retardant and smoke retardant and smoke retardant properties were determined as follows:

Types of Measurements

1. Flame retardant properties are appraised based on the ability of a material to resist flaming as indicated by a low flame spread considered in a comparative context — involving other flame retardant complexes and controls. Flame spreads are measured on a scale of 1.0 to 10.0 with 10 sub-divisions within each full unit. FS means Flame Spread. FS is manually evaluated by a technician who observes the fire test through a window that extends the full length of the fire chamber.

2. Smoke retardant properties are appraised based on the ability of a material to resist smoking as indicated by a low smoke density considered in a comparative context involving other smoke retardant complexes and controls. Smoke is measured via the generation of an electric current or the interference thereupon by smoke as it passes between a light source and a photo electric power cell. The primary measurement evaluated is a dynamic cumulative volumetric figure representing the total amount of interference in light transmission caused by the evolution of smoke from the burning sample. The measurement is called Total Smoke Per Sample. A second type of measurement is a static linear measurement of smoke levels every second throughout the duration of a fire test that may last from 180 seconds to 600 seconds. This measure is called the Maximum Smoke Level Factor. It can be very important in predicting the ability of a smoke retardant to enable a polymer to pass a burn test that does not destroy the entire sample or is of short duration. "Total Smoke Per Sample" (TSPS) is completely different from Maximum Smoke Level Factor (MSLF) and a smoke retardant that performs well under the TSPS rating may get a poor rating under the MSLF measurement. Additives that improve a polymer's performance under either TSPS or MSLF would be beneficial.

In the test procedure, cast polyester rods containing smoke suppressant additives are burned for 10 minutes in a 5 foot tunnel under specific test conditions. A centrifugal fan continuously draws the smoke through the tunnel to a smoke chamber and then to a duct which leads to exhaust points. In tests on 12 inch long $\times$ 0.520 inch rod castings of a polymer, the rods are supported against the top of the tunnel with nichrome wires spaced $\frac{1}{2}$" apart across the tunnel width. One end of the rod is at the 1.8 foot mark. An $1\frac{1}{2}$ inch Tirrill burner 8 inches below and 3 inches in front of the specimen is the ignition source. Flame intensity is kept constant with a gas pressure regulator on the gas feed.

The $64 \times 13 \times 6$ inch ID fire test chamber is equipped with a 150 watt PAR Flood lamp at one end and a photocell at the opposite end. The photocell output is monitored with a strip chart recorder and an Averager set for a ten minute interval. At the start of a test, the base line (100% light transmission) is adjusted to about 90% of the chart scale. Smoke produced during the test period reduces light transmission and these changes are reflected in photocell output current. The difference between the average reading during the 10 minute test and the base line before the test (100% transmission) is the smoke. Total smoke, therefore, is the area of the curve above base line. It may be expressed as a box count, measured with a plainimeter for a 1/100 square centimeter count or reported as a percentage of total light transmission (% smoke). To compensate for differences in chart units, chart speed and base line, total smoke may be expressed as percent smoke or percent of 100% light transmission obscured by smoke. The measurement or count is simplified by an Averager hook-up to the recorder which gives the average base line during the 10 minute test period.

$$\text{Thus, percent Smoke} = \frac{\text{Original} - \text{average base line} \times 100}{\text{original base line}}$$

Since the % smoke is determined on a constant volume of sample (same size rods), a valid comparison may be made between different compositions burned under the same test condition. Procedure for evaluating polymeric materials fabricated as rods:

Set Tunnel Conditions:
Gas pressure to burner
Draft setting
Ignition point
Set Recorder:
Set base line, chart speed and
Averager.

Warm tunnel to proper starting temperature and check test conditions. Place one end of the $\frac{1}{2}$ inch rod at the 1.8 ft. mark on the nichrome support wires. Cover with $\frac{1}{4}$ inch transite board and close tunnel. Recheck and adjust zero and base line of the recorder at a 1 inch per minute chart speed. Ignite burner and simultaneously start a stop watch and the ten minute cycle on the Averager. Record tunnel temperature and flame spread at one minute intervals. Turn off burner at 10.0 minutes and record after-burn and base line average indicated by Averager. Calculate and report per cent smoke from the base line data.

Unless otherwise stated, the tests were carried out at maximum fire conditions and maximum smoke conditions. Total volume of smoke (TSPS) evolved was measured rather than maximum level of smoke at various points throughout the tests (MSLT) unless otherwise noted.

In the following examples and the drawings the flame and smoke retardant compositions are indicated as follows:

| Compositions | |
|---|---|
| A consists of: | |
| x Mg(OH)$_2$ | x, y = variables |
| y 2Al(OH)$_3$ (alumina trihydrate) | B consists of: |
| | x, y, z = variables |
| x Mg(OH)$_2$ | |
| y 2Al(OH)$_3$ (alumina trihydrate) | |
| z 25% Sb$_2$O$_3$ . 75% SiO$_2$ | |
| C consists of: | |
| | x, y, w = variables |
| x Mg(OH)$_2$ | |
| y 2Al(OH)$_3$ (alumina trihydrate) | |

-continued

| Compositions | |
|---|---|
| w Sb₂O₃ D consists of: | no variables |
| x Mg(OH)₂ G consists of: | no variables |
| z 25% Sb₂O₃ . 75% SiO₂ H consists of: | no variables |
| y 2Al(OH)₃ I consists of: | no variables |
| w Sb₂O₃ | |

Illustration of how formulations are written:
Example No. I — Composition of
20 parts Mg(OH)₂
80 parts 2Al(OH)₃
would be written A x, y = A 2, 8
Example No. II — Composition of
100 parts 2Al(OH)₃
would be written H$_y$=H$_1$ The drawings are graphs which illustrate certain compositions within the invention in comparison with compositions outside the invention in flame and/or smoke retardancy.

Example 1

Unsaturated polyester thermosetting plastic of the isophthalic-maleic-neopentyl glycol base type.

The resin employed was Marco GR 77006 in an amount of 95 parts and 5 parts of styrene using additive in an amount of 100 parts phr. The flame spread results were as follows:

| No filler | 5.9 |
|---|---|
| CaO₃ | 5.4 |
| Hy = H$_1$ | 4.9 |
| A x,y = A 0.5, 9.5 | 4.87 |
| A x,y = A 1, 9 | 4.94 |
| A x,y = A 2, 8 | 4.77 |
| A x,y = A 3, 7 | 5.1 |
| A x,y = A 4, 6 | 5.0 |

In the range A x,y where x is 20–25%, A x,y is superior to H. The mixture of A x,y can be used in an amount of 1 to 300 parts phr.

In smoke (TSPS) retardant properties Composition A is equal to or slightly superior to H and much superior to CaCO₃ or Composition D at 100 parts phr. Although at 25 and 50 parts phr H is superior and also as the amount of additive is reduced to 25 parts phr there is no significant difference between D and A. This lack of superiority of A over H was observed only with neopentyl glycol ester containing resins. Composition A was much superior to CaCO₃ or a blank over the range of 25 to 100 parts phr.

EXAMPLE 2

Unsaturated polyester thermosetting plastic of the phthalic anhydride-maleic-propylene glycol base type.
The resin employed was Marco GR 12227.
The flame spread (FS) results were as follows:

| No filler | 5.2 |
|---|---|
| Hy | 4.04 |
| A x,y A 0.5, 9.5 | 3.98 |
| A x,y A 1, 9 | 3.95 |
| A x,y A 1.5, 8.5 | 4.1 |
| A x,y A 2, 8 | 4.07 |
| A x,y A 5, 5 | 4.15 |

The composition A xy A 1, 9 can be added for example in an amount of 1 to 200 parts phr. The A x,y ratio can go from A 1-99, 99-1.

In a test of smoke reduction (measured in TSPS) at 100 parts phr composition A 1, 9 was 16.3% superior to H. The results on smoke reduction were as follows.

| No filler | 46 |
|---|---|
| Hy | 27.5 |
| A x,y A 0.5, 9.5 | 24.5 |
| A x,y A 1, 9 | 24.9 |
| A x,y A 2, 8 | 25.5 |
| A x,y A 5, 5 | 23 |

EXAMPLE 3

Unsaturated polyester thermosetting plastic of the convention phthalic-maleic-propylene glycol base type. The resin employed was Rohm & Haas P-43.

In the flame test, all compositions passed the UL-94 (Underwriters Laboratory Specification 94) with a V.O. rating.

In the smoke test A x,y A 1, 1 was superior to H by 75.3% at 100 parts phr. Composition A x,y, A 1, 1 was also suprior to D by 6.7% at 100 parts phr. There can be used 1–200 parts phr A x,y = A 1,1. Also, there can be used for example B x,y, z = B 45, 45, 10 to replace A x,y in this formulation. This measurement was performed in an ASTM D 2843-70 Smoke Chamber.

EXAMPLE 4

Unsaturated polyester thermoplastic of the isophthalic acid base type. The resin employed was Fiberglas Canada IPA-F 95. The maximum fire conditions were employed causing complete charring of the entire sample.

In the flame spread test while H was the best, A x, y = A 1, 1 was almost as good even though it only contained 50% as much H.

At 25–55 parts phr B x, y, z = 4.5, 4.5, 1.0, smoke as MSLF was superior to H and at 25 parts to a point below 50 parts A x, y = A 1, 1 was better than H and was also better than B at 25 parts phr. At some point about 50 to 100 parts phr (probably at about 58 phr) H was the best. Both A and B were superior to CaCO₃ in the entire range of 25-100 parts phr tested.

EXAMPLE 5

Unsaturated polyester thermoplastic of the chlorendic ester base type. The resin employed was Hooker Hetron 92 Resin (40% chlorine before dilution) which was diluted to 24% chlorine content by adding 50% styrene.

Figure 2:
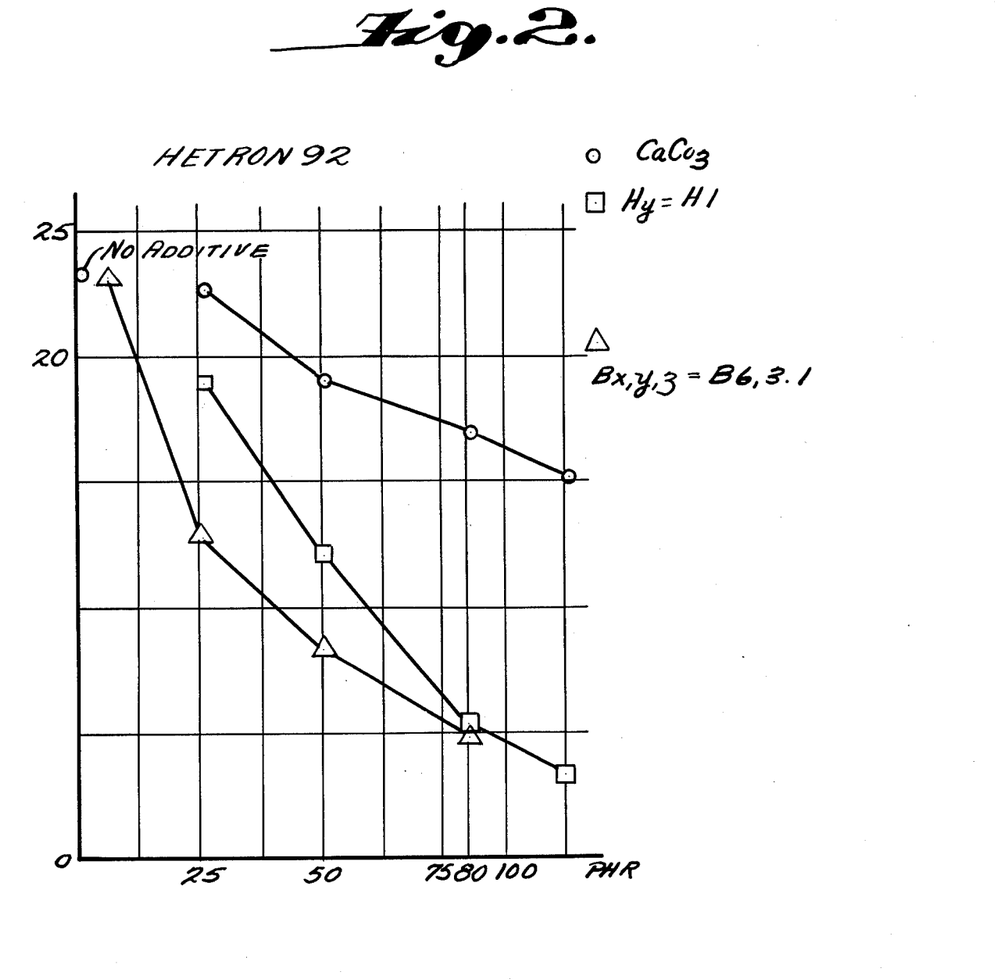
FIG. 2 is a graph wherein the resin is Hetron 92.

The results in the smoke retardant test (TSPS) are shown in FIG. 2. At levels of from 25 to 80 parts phr additive B x, y, z, = B 6, 3, 1 was superior to Hy = $Hy_1$ and to calcium carbonate. Additive B 6, 3, 1 was also superior to Dx = $D_1$ (not shown in the graph) in the same range. Additive B 6, 3, 1 was as good as $H_1$ at 100 parts phr.

Particularly effective results for B 6, 3, 1 occur in the range 49-100 parts phr. It was also found that A x, y = A 1, 1 was effective in smoke retardance at 100 parts phr. Other very effective formulations were B 6, 3, 1 at 6-49 parts phr, B x, y, z = B 4.5, 4.5, 1 at 25-37 parts phr and B x, y, z = B 3, 6, 1.

In flame retardant tests (based on FS measurements) A x, y = A 1, 1 was employed at 25, 50 and 100 parts phr. At 25 prts phr, it was about the same as Hy = $H_1$ (4.25 × 4.20). No tests were made with $H_1$ at other proportions. The combination of A x, y = A 1, 1 with $G_z$ employing 25 parts phr total additive (of which 2.5 parts were $G_z$) was almost as effective as H employing the same amount of $G_z$. This was also true when the total additive was 100 parts phr and $G_z$ was 10 parts.

EXAMPLE 6

Unsaturated polyester thermosetting pastic of the chlorendic ester base type. The resin employed was Fiberglas Canada Vibrin V-534 (28% chlorine before dilution) which was diluted to 20% chlorine content by adding 30% styrene.

In smoke reduction measured in TSPS over the range 5-25 parts phr A x, y = A 1, 1 was superior to Hy = $H_1$. Thus at 10 parts pr $H_1$ had a smoke value of 38.4 and A 1, 1 a smoke value of 25.8 and at 25 parts phr $H_1$ had a smoke value of 35 and A 1, 1 a smoke value of 23.3.

B x, y, z = B 4.5, 4.5, 1 had a smoke value of 29.5 at 10 parts phr and a smoke value of 29 at 25 parts phr.

Figure 3:
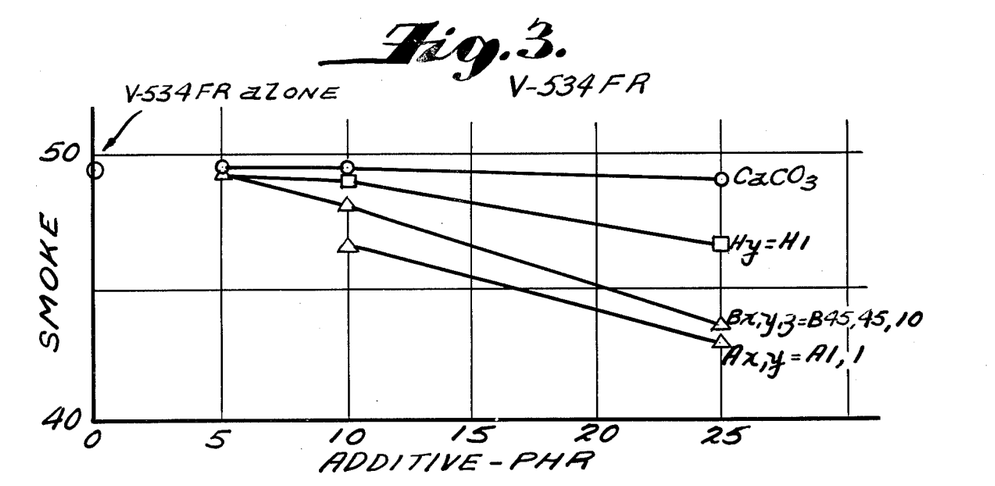
FIG. 3 is a graph wherein the resin in Vibrin V-534 FR.

The results of Maximum Smoke Level Factor (MSLF) tests are shown in FIG. 3 at additive levels from 5 to 25 parts phr.

EXAMPLE 7

Unsaturated polyester thermosetting plastic of the brominated-bisphenol A base type. The resin employed was ICI United States Atlac 711-05A (40% bromine before dilution) diluted to 20% bromine with 50% styrene.

In the flame spread test at 40 parts phr composition B x, y, z = B 43.75, 43.75, 12.5 was superior to HyGz = H 87.5, G 12. 5.

Figure 1:
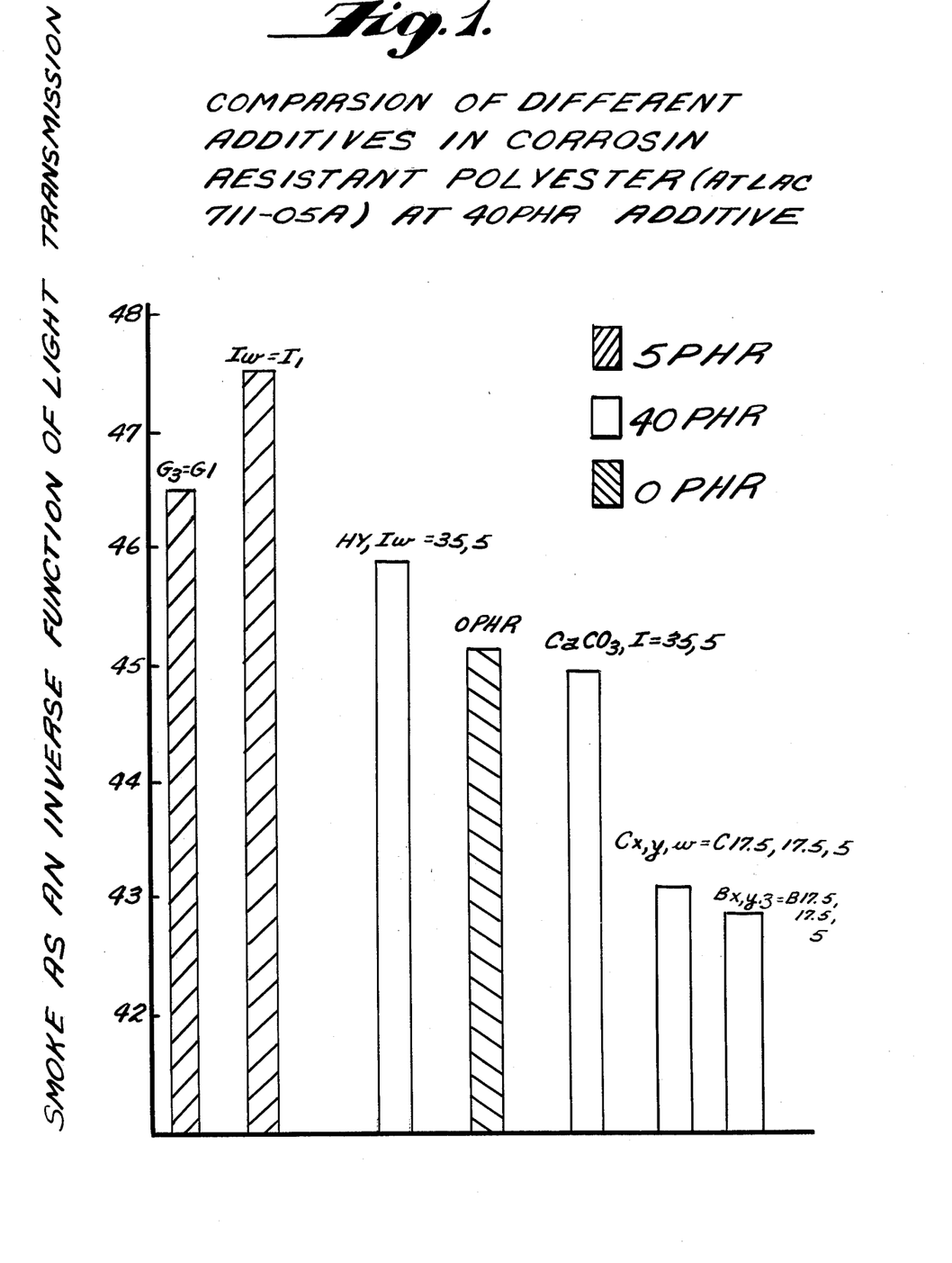
FIG. 1 is a graph wherein the resin is Atlac 711-05A.

As shown in FIG. 1 in the smoke test at 40 parts phr, B x, y, z = B 43.75, 43.75, 12.5 was superior to C x, y, w = C 43.75, 43.75, 12.5 which in turn was superior to Hy = $H_1$. The band C formulations can be used for example in the range of 1 to 100 parts phr.

EXAMPLE 8

Epoxy Plastics

Figure 5:
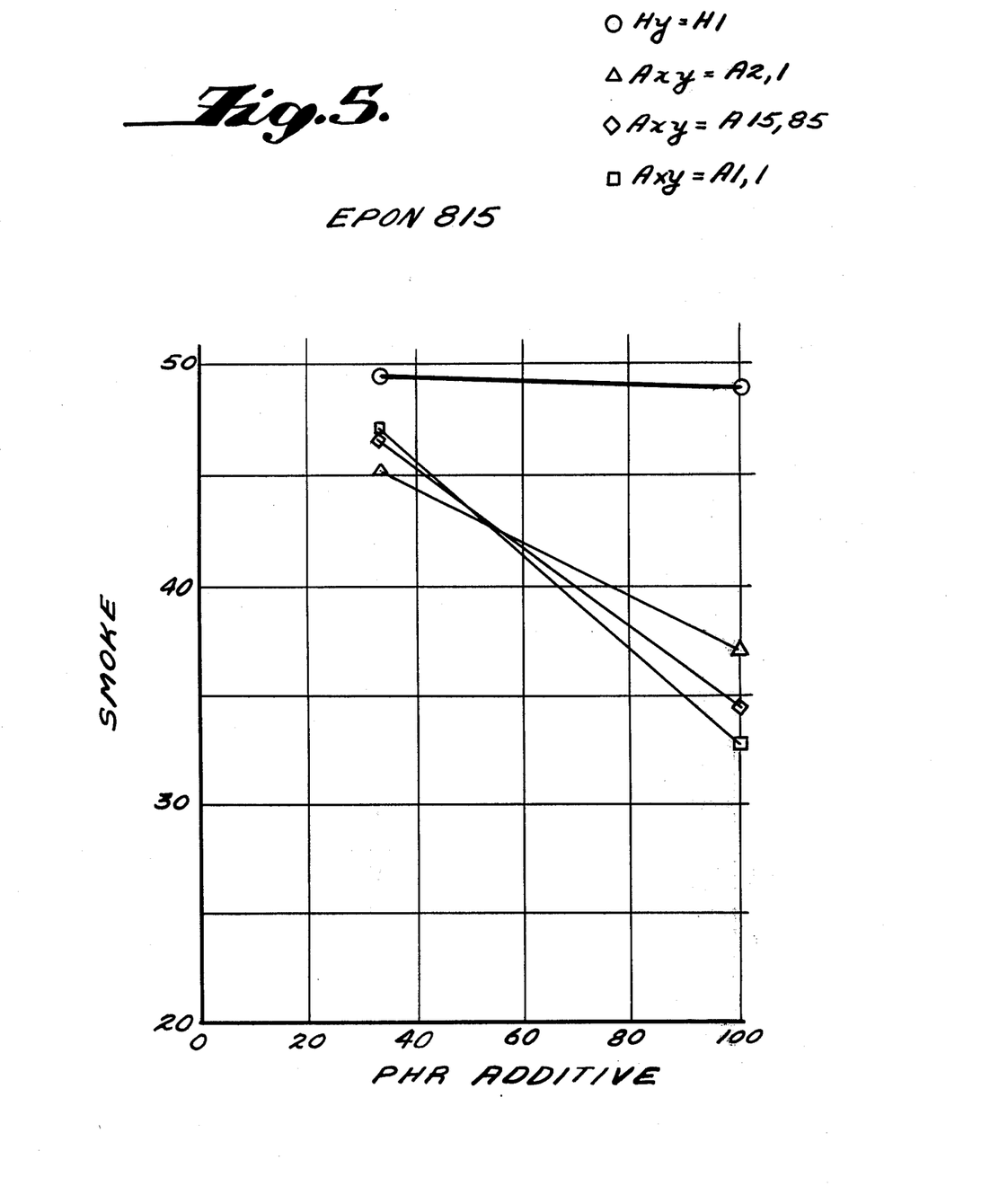
FIG. 5 is a graph wherein the resin is Epon 815.

The resin employed was Shell Epon 815. The results in smoke reduction are shown in FIG. 5. The additives can be used for example in amounts of 1 to 300 parts phr.

EXAMPLE 9

Urethane Foam

Figure 4:
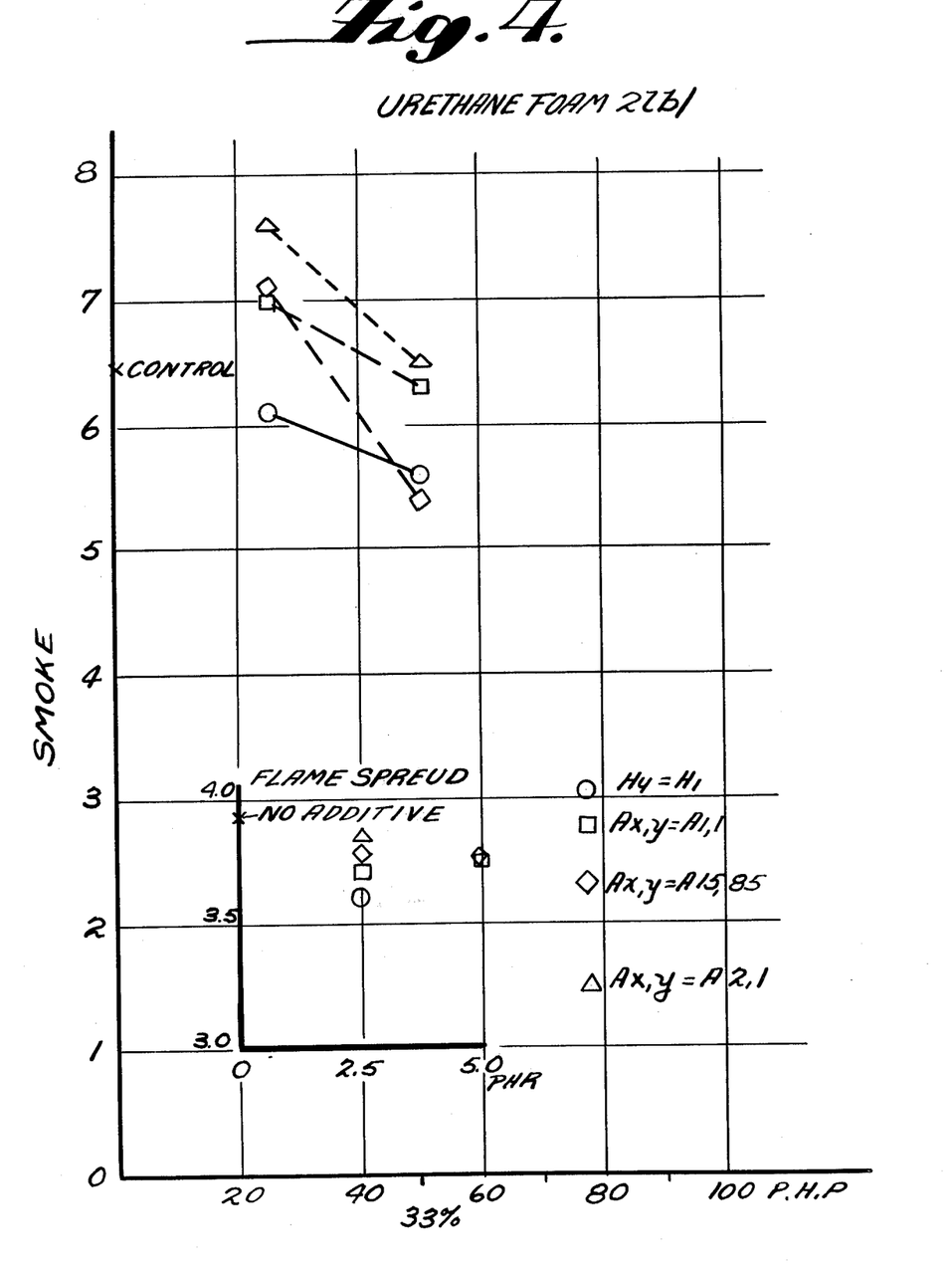
FIG. 4 is a graph wherein the resin is a polyurethane foam.

The resin employed was Witco Chemical urethane PE 2 (a polether type polyurethane). The results on both smoke (TSPS) and flame spread properties are shown in FIG. 4. At the higher levels of additive, the composition A x, y = A 15, 85 gave the best results.

EXAMPLE 10

Polyvinyl Chloride Resin

The resin employed was Hooker Rucco PVC resin. In the range of 5.8 to 11.5 parts phr composition B x, y, z = B 6, 3, 1 was better than either Hy = $H_1$ or $D_x$ = $D_1$ in reducing flame spread and smoke (TSPS).

The compositions of the invention can be added in an amount of 1 to 700 parts phr. The rods of GR 77006 employed in example 1 were prepared from a mixture of 95 parts GR 77006, 5 parts styrene, 0 to 100 parts additive, 1 part Percadox 16, 1 part USP 245 and 0.05-0.07 part DMA (dimethylaniline). Room temperature gelling occurred in 15-20 minutes and curing was carried out for 1-3 hours at room temperature followed by 45 minutes at 300° F.

The rods of GR 12227 used in example 2 were prepared from a mixture of 100 parts GR 12227, 0 to 100 parts additive and 1 part F-85 (methyl ethyl ketone peroxide) and gelled at room temperature in 15-20 minutes.

The rods of Paraplex P 43 used in example 3 were prepared from a mixture of 100 parts P 43, 100-150 parts additive, 1 part of USP 245 with curing for 3 hours at 160°-250° F.

The rods of Vibrin F 95 used in example 4 were prepared from a mixture of 100 parts Vibrin F 95, 0 to 100 parts additive and 1.5 parts of MEK peroxide with gelling at room temperature in 10-70 minutes followed by curing for 1-3 hours at room temperature and 1 hour at 200° F.

The rods of Hetron 92 employed in example 5 were prepared from the Hetron 92 and styrene plug 0 to 100 parts phr of additive, 1 part Percadox 16, 1 part USP 245 and 0.05 part DMA, gelling at room temperature for 10-20 minutes followed by curing for 1-3 hours at room temperature plus 45 minutes at 300° F.

The rods of Vibrin V-534 LS used in example 6 were prepared from a mixture of 95 parts Vibrin V-534 LS, 5 parts styrene, 0 to 75 parts additive 2 parts of 50% benzoyl peroxide and 0.2 part DMA, gelling at room temperature for 10-10 minutes followed by 1-3 hours at room temperature pulse 1 hour at 200° F.

The rods of Atlac 711-05A employed in example 7 were prepared from a mixture of 100 parts Atlac 711-05A, 1.0 part cobalt octoate (12% solution), 0 to 40 parts additive and 0.9 MEK peroxide with gelling at room temperature for 10-15 minutes followed by curing at room temperature.

The rods of Epon 815 employed in example 8 were prepared from a mixture of 88.5 parts Epon 815, 0 to 100 parts of additive and 11.5 parts of triethylene tetramine with gelling at room temperature for 30 minutes followed by room temperature cure and then 1 hour at 180°-240° F.

The Witco PE urethane foam employed in example 9 was Freon blown to a density of 2 lbs./cu. ft. There were used 0 to 50 parts of additive with 50 parts of Witco PE 2 part A and 50 parts of Witco PE 2 part B with curing at room temperature.

The polyvinyl chloride film employed in example 10 was formulated as follows:

| | |
|---|---|
| Polyvinyl chloride resin | 49.32 parts |
| Stauffer phosphate plasticizer | 15.78 |

-continued

| Monsanto phthalate plasticizer | 15.24 |
| --- | --- |
| Epoxy plasticizer | 5.38 |
| Antimony trioxide | 8.97 |
| Titanium dioxide pigment | 5.09 |
| Metallic stearate | 0.18 |
| Stabilizer | 0.04 |
|  | 100.00 |
| Additive | 0 to 20 parts |

The mixture was compounded on a hot two-roll mill to a thickness of 3 mils.

The compositions of the invention can comprise, consist essentially of or consist of the stated materials.

I claim:

1. A composition comprising (I) a mixture comprising (a) magnesium hydroxide and (b) alumina trihydrate and (II) a polymer which is (A) a polyester, (B) an epoxy resin, (C) a vinyl chloride polymer or (D) a polyurethane, the mixture of magnesium hyroxide and alumina trihydrate being present in an amount sufficient to impart improved flame or smoke resistance, wherein (1) when the polymer is a non-halogenated polyester there is employed 25 to 100 parts of (I) per 100 parts of polymer, the ratio of (a) to (b) being from 5:95 to 95:5; (2) when the polymer is a halogenated polyester there is employed 5 to 100 parts of (I) per 100 parts of polymer, the ratio of (a) to (b) being from 5:95 to 2:1; (3) when the polymer is an epoxy resin there is employed 5 to 100 parts of (I) per 100 parts of polymer, the ratio of (a) to (b) being from 9:95 to 2:1 at 5 to 90 parts per 100 parts of polymer and 5:95 to 1:1 at above 90 up to 100 parts per 100 parts of polymer (4) when the polymer is a vinyl chloride polymer there is employed 4 to 50 parts of (I) per 100 parts of polymer, the ratio of (a) to (b) being 5:95 to 95:5; and (5) when the polymer is a polyurethane there is employed 50 parts of (I) per 100 parts of polymer, the ratio of (a) to (b) being 1:1.

2. A composition according to claim 1 wherein the polymer is a non-halogenated polyester.

3. A composition according to claim 2 wherein the mixture (I) consists of mangesium hydroxide and alumina trihydrate and is present in an amount sufficient to impart improved flame resistance, there being employed 25 parts of (I) per 100 parts of polymer.

4. A composition according to claim 2 wherein the mixture (I) consists of magnesium hydroxide and alumina trihydrate and is present in an amount sufficient to impart improved smoke resistance, there being employed 25 parts of (I) per 100 parts of polymer, the ratio of (a) to (b) being from 5:95 to 1:1.

5. A composition according to claim 2 wherein the mixture (I) consists of magnesium hydroxide and alumina trihydrate is present in an amount sufficient to impart improved smoke resistance, there being employed 100 parts of (I) per 100 parts of polymer, the ratio of (a) to (b) being from 5:95 to 1:1.

6. A composition according to claim 1 wherein the polymer is a halogenated polyester.

7. A composition according to claim 6 wherein the mixture (I) consists of (a) magnesium hydroxide, (b), alumina trihydrate and (c) a mixture of antimony trioxide and silica in the ratio of 1:3, the ratio of (a) to (b) to (c) being 6:3:1 and (I) being present in an amount sufficient to impart improved smoke resistance, there being employed 25 to 50 parts of (I) per 100 parts of polymer.

8. A composition according to claim 6 wherein the mixture (I) consists of magnesium hydroxide and alumina trihydrate and is present in an amount sufficient to impart improved smoke resistance, there being employed 5 to 100 parts of (I) per 100 parts of polymer, the ratio of (a) to (b) being from 5:95 to 2:1.

9. A composition according to claim 8 wherein there is employed 5 to 25 parts of (I) per 100 parts of polymer, the ratio of (a) to (b) being from 5:95 to 2:1.

10. A composition according to claim 9 wherein there is employed 5 parts of (I) per 100 parts of polymer, the ratio of (a) to (b) being from 5:95 to 1:2.

11. A composition according to claim 9 wherein there is employed 5 parts of (I) per 100 parts of polymer, the ratio of (a) to (b) being 2:1.

12. A composition according to claim 9 wherein there is employed 10 parts of (I) per 100 parts of polymer, the ratio of (a) to (b) being from 5:95 to 2:1.

13. A composition according to claim 12 wherein the ratio of (a) to (b) is from 1:2 to 2:1.

14. A composition according to claim 9 wherein there is employed 25 parts of (I) per 100 parts of polymer, the ratio of (a) to (b) being from 5:95 to 2:1.

15. A composition according to claim 14 wherein the ratio of (a) to (b) is from 1:2 to 2:1.

16. A composition according to claim 15 wherein the ratio of (a) to (b) is 1:2.

17. A composition according to claim 8 wherein there is employed 25 to 100 parts of (I) per 100 parts of polymer, the ratio of (a) to (b) being from 5:95 to 2:1.

18. A composition according to claim 17 wherein there is employed 50 to 100 parts of (I) per 100 parts ogf polymer, the ratio of (a) to (b) being from 1:2 to 2:1.

19. A composition according to claim 18 wherein there is employed 50 parts of (I) per 100 parts of polymer, the ratio of (a) to (b) being from 1:1 to 1:2.

20. A composition according to claim 19 wherein the ratio of (a) to (b) is 1:1.

21. A composition according to claim 18 wherein there is employed 100 parts of (I) per 100 parts of polymer.

22. A composition according to claim 21 wherein the ratio of (a) to (b) is 1:2.

23. A composition according to claim 21 wherein the ratio of (a) to (b) is 2:1.

24. A composition according to claim 1 wherein the polymer is a polyurethane and the mixture consists of magnesium hydroxide and alumina trihydrate and is present in an amount sufficient to impart improved smoke resistance, there being employed 50 parts of (I) per 100 parts of polymer, the ratio of (a) to (b) being 1:1.

25. A composition according to claim 1 wherein the polymer is a vinyl chloride polymer.

26. A composition according to claim 25 wherein the mixture (I) consists of magnesium hydroxide and alumina trihydrate and is present in an amount sufficient to impart improved smoke resistance, there being employed 4 to 50 parts of (I) per 100 parts of polymer, the ratio of (a) to (b) being from 5:95 to 2:1.

27. A composition according to claim 26 wherein there is employed 4 to 20 parts of (I) per 100 parts of polymer.

28. A composition according to claim 27 wherein the ratio of (a) to (b) is from 1:2 to 2:1.

29. A composition according to claim 28 wherein there is employed 5.8 to 11.5 parts of (I) per 100 parts of resin.

30. A composition according to claim 29 wherein there is employed 11.5 parts of (I) per 100 parts of resin.

31. A composition according to claim 30 wherein the ratio of (a) to (b) is 2:1.

32. A composition according to claim 27 wherein the ratio of (a) to (b) is 5:95.

33. A composition according to claim 25 wherein the mixture (I) consists of magnesium hydroxide and alumina trihydrate and is present in an amount sufficient to impart improved smoke resistance, there being employed 25 to 50 parts of (I) per 100 parts of polymer, the ratio of (a) to (b) being from 95:5 to 1:2.

34. A composition according to claim 33 wherein the ratio of (a) to (b0) is from 2:1 to 1:2.

35. A composition according to claim 33 wherein there is employed 25 parts of (I) and the ratio of (a) to (b) is from 95:5 to 2:1.

36. A composition according to claim 35 wherein the ratio of (a) to (b) is 2:1.

37. A composition according to claim 33 wherein there is employed 50 parts of (I) and the ratio of (a) to (b) is from 2:1 to 1:2.

38. A composition according to claim 37 wherein the ratio of (a) to (b) is 2:1.

39. A composition according to claim 38 wherein the ratio of (a) to (b) is 1:2.

40. A composition according to claim 25 whein the mixture (I) consists of magnesium hydroxide and alumina trihydrate and is present in an amount sufficient to impart improved flame resistance, there being employed 5.8 to 11.5 parts of (I) per 100 parts of polymer and the ratio of (a) to (b) being 5:95 to 95:5.

41. A composition according to claim 40 wherein there is employed 11.5 parts of (I) per 100 parts of polymer.

42. A composition according to claim 41 wherein the ratio of (a) to (b) is 2:1.

43. A composition according to claim 1 wherein the polymer is an epoxy resin.

44. A composition accordng to claim 43 wherein the mixture (I) consists of magnesium hydroxide and alumina trihydrate and is present in an amount sufficient to impart improved smoke resistance, there being employed 30 to 90 parts of (I) per 100 parts of polymer, the ratio of (a) to (b) being from 5:95 to 2:1.

45. A composition according to claim 44 wherein the ratio of (a) to (b) is from 5:95 to 1:2.

46. A composition according to claim 44 wherein the ratio of (a) to (b) is from 5:95 to 1:1.

47. A composition according to claim 44 wherein there is employed 75 to 90 parts of (I) per 100 parts of polymer.

48. A composition according to claim 47 wherein the ratio of (a) to (b) is 5:95 and there is employed 90 parts of (I) per 100 parts of polymer.

49. A composition according to claim 47 wherein there is employed 90 parts of (I) per 100 parts of polymer and the ratio of (a) to (b) is 1:1.

50. A composition according to claim 47 wherein there is employed 90 parts of (I) per 100 parts of polymer and the ratio of (a) to (b) is 1:1.

51. A composition according to claim 47 wherein there is employed 75 parts of (I) per 100 parts of polymer and the ratio of (a) to (b) is 5:95.

52. A composition according to claim 47 wherein there is employed 75 parts of (I) per 100 parts of polymer and the ratio of (a) to (b) is 1:1.

53. A composition according to claim 47 wherein there is employed 75 parts of (I) per 100 parts of polymer and the ratio of (a) to (b) is 2:1.

54. A composition according to claim 43 wherein the mixture (I) consists of magnesium hydroxide and alumina trihydrate and is present in an amount sufficient to impart improved smoke resistance, there being employed 10 parts of (I) per 100 parts of polymer, the ratio of (a) to (b) being from 5:95 to 1:1.

55. A composition according to claim 54 wherein the ratio of (a) to (b) is 5:95.

56. A composition according to claim 54 wherein the ratio of (a) to (b) is 1:1.

57. A composition according to claim 54 wherein the ratio of (a) to (b) is 1:2.

* * * * *

Disclaimer 4,147,690.—*Russell P. Rich*, Baltimore, Md. SMOKE AND FIRE RESISTANT COMPOSITIONS. Patent dated Apr. 3, 1979. Disclaimer filed July 9, 1979, by the assignee, *The Burns & Russell Company*.

Hereby enters this disclaimer to claims 1 and 25 of said patent.

[*Official Gazette September 4, 1979.*]